(12) United States Patent
Wilby

(10) Patent No.: US 8,191,419 B2
(45) Date of Patent: Jun. 5, 2012

(54) MULTIPLE-SENSOR MEASURING DEVICE FOR ON-BOARD GAUGING PROBE

(75) Inventor: Richard Wilby, Pibrac (FR)

(73) Assignee: Airbus, Blagnac (FR)

( * ) Notice: Subject to any disclaimer, the term of this patent is extended or adjusted under 35 U.S.C. 154(b) by 484 days.

(21) Appl. No.: 12/441,486

(22) PCT Filed: Sep. 17, 2007

(86) PCT No.: PCT/FR2007/051948
§ 371 (c)(1),
(2), (4) Date: Mar. 16, 2009

(87) PCT Pub. No.: WO2008/035002
PCT Pub. Date: Mar. 27, 2008

(65) Prior Publication Data
US 2009/0234597 A1 Sep. 17, 2009

(30) Foreign Application Priority Data
Sep. 20, 2006 (FR) ...................................... 06 53831

(51) Int. Cl.
*G01F 23/26* (2006.01)

(52) U.S. Cl. ...................................................... 73/304 C
(58) Field of Classification Search ........................ None
See application file for complete search history.

(56) References Cited

U.S. PATENT DOCUMENTS

| 4,420,976 | A | 12/1983 | Orloff et al. |
| 4,434,657 | A | 3/1984 | Matsumura et al. |
| 5,187,979 | A | 2/1993 | Edmark, III |
| 6,655,221 | B1 * | 12/2003 | Aspelund et al. ........... 73/861.04 |
| 2002/0194906 | A1 | 12/2002 | Goodwin et al. |

* cited by examiner

*Primary Examiner* — Hezron E Williams
*Assistant Examiner* — Alex DeVito
(74) *Attorney, Agent, or Firm* — Oblon, Spivak, McClelland, Maier & Neustadt, L.L.P.

(57) ABSTRACT

A multiple-sensor device for a gauging system including: an insert configured to be inserted along an axis in a capacitive probe so as to assume a predetermined axial position with regard to the probe; a support on which a plurality of sensors are mounted; and a retaining mechanism to maintain the support at a predetermined distance from the insert along the axis.

20 Claims, 5 Drawing Sheets

MULTIPLE-SENSOR MEASURING DEVICE FOR ON-BOARD GAUGING PROBE

TECHNICAL FIELD

The present invention concerns the field of fuel gauging systems, in particular for application in aeronautics.

PRIOR ART

Known from the prior art are several types of probes for measuring the quantity of fuel in an aircraft tank. The most commonly used is a gauging probe of the capacitive type comprising two electrodes in the form of cylindrical tubes arranged one in the other coaxially. The probe is open at both of its ends such that the fuel freely enters the space between the electrodes. The capacity of the capacitor formed by the two electrodes depends linearly on the height of the fuel column between the two tubes. A description of this type of capacitive probe can be found in patent application FR-A-2582396, for example.

Capacitive probes are not, however, fully satisfactory. Indeed, the value of the capacity measured depends on the dielectric coefficient of the fuel. However, this coefficient varies according to the quality of the fuel and its potential contamination rate by water, during fueling. In order to prevent measurement errors, one is led to provide for a complex gauging system integrating different types of sensors. In practice, this system comprises a plurality of capacitive probes, called primary probes, high level detectors, low level detectors, measurement sensors for permittivity, density, temperature, etc. Lastly, most airplanes are also equipped with a second type of gauging probes, called secondary, which can be used on the ground in case of failure of the primary probes. These secondary probes typically use a magnet secured to a float, the magnet moving with regard to the magnetic flow sensors according to the height of the fuel. In particular, a description of this type of MFLI (Magnetic Fuel Level Indicator) probe can be found in patent application DE-A-4128178.

The installation of the aforementioned sensors or MFLI probes often requires perforating the tank as well as the lower wall of the wing in several places. In this case, one must provide for sealed mounting, which unfailingly introduces risks of leaks and complicates maintenance operations. Moreover, a reinforcement must be added locally around the perforated hole, which increases the weight of the apparatus.

The first aim of the present invention is to propose a fuel gauging system with easy installation and maintenance not requiring perforation of the tank.

A second aim of the invention is to propose a measurement device with microelectromechanical sensors (MEMS) which can be easily integrated into the existing gauging systems.

BRIEF DESCRIPTION OF THE INVENTION

The present invention is defined by a multiple-sensor measurement device for a gauging system, comprising:
- an insert designed to be inserted along an axis into a capacitive probe so as to assume a predetermined axial position relative to said probe;
- a support on which a plurality of sensors is mounted;
- and retaining means for maintaining said support at a predetermined distance from said insert along said axis.

Advantageously, said plurality of sensors comprises at least one MEMS sensor.

Said plurality of sensors preferably comprises at least one pressure sensor and one density sensor. It may also comprise at least one permittivity sensor.

According to one embodiment, said plurality of sensors comprises sensors of identical natures.

Said retaining means advantageously comprise first retaining means mounted on said insert and second retaining means mounted on the first ones using quick securing means, the support being captive between the first and the second retaining means when said quick securing means are locked.

According to one embodiment, the insert has an annular shape and has a threaded axial bore.

The first retaining means are preferably formed by a first cylindrical piece, coaxial with the insert, and ending at its upper part with a threaded tubular head designed to be screwed into said bore, said cylindrical piece being pierced by an axial hole, all the way through it.

The second retaining means are preferably formed by a second cylindrical piece, coaxial with the first, and pierced with an axial hole, all the way through.

First and second circular channels are advantageously arranged across from each other, in the lower surface of the first cylindrical piece and in the upper surface of the second cylindrical piece, respectively, the support being formed by an annular film whereof the upper portion is freely engaged in the first channel and the lower portion is freely engaged in the second channel.

A connection interface shared by the different sensors can be mounted on the outer surface of the annular film, the connection wires between said sensors and said interface then being buried in the material of said film.

The material of said film is advantageously polycarbonate.

In order to protect the sensors, they are advantageously mounted on the inner surface of the annular film.

According to a first variant, said quick securing means comprise, on one hand, slugs mounted on one of the first and second cylindrical pieces and, on the other hand, corresponding bores in the other piece, said slugs being dimensioned to engage forcibly in said corresponding bores.

According to a second variant, said quick securing means comprise, on one hand, snap-fit tabs which are an integral part of one of the first and second cylindrical pieces, and on the other hand, a corresponding groove in the other piece, said tabs being adapted to snap into said corresponding groove.

The invention also concerns a fuel gauging system onboard an aircraft comprising:
- a plurality of capacitive probes installed at predetermined heights in a plurality of fuel tanks;
- a plurality of multiple-sensor measurement devices as defined above, said devices being mounted respectively on said capacitive probes;
- a plurality of local processors, each local processor being adapted to perform processing of the measurement data coming from the capacitive probes, of the multiple-sensor measurement devices to which it is connected;
- a central processor adapted to calculate, from the data thus processed and the geometric characteristics of said plurality of tanks, the quantity of fuel that they contain.

The gauging system may also comprise a plurality of auxiliary sensors installed in said plurality of tanks, each auxiliary sensor belonging to an assembly made up of a high level detector, a low level detector, a water sensor and a temperature sensor, each auxiliary sensor being connected to one of said local processors, the latter being adapted to process the measurement data coming from said auxiliary sensor.

Advantageously, the auxiliary sensors are MEMS sensors.

In order to protect these sensors, each MEMS sensor is advantageously mounted on the inner surface of a caliper, the feet of which are bolted onto the internal structure of the aircraft.

BRIEF DESCRIPTION OF THE DRAWINGS

Other characteristics and advantages of the invention will appear upon reading one preferred embodiment of the invention done in reference to the attached figures in which.

DETAILED DESCRIPTION OF PARTICULAR EMBODIMENTS

The idea at the base of the present invention is to use the primary capacitive probes to integrate a multiple-sensor measurement device therein, in particular with MEMS sensors.

Figure 1:
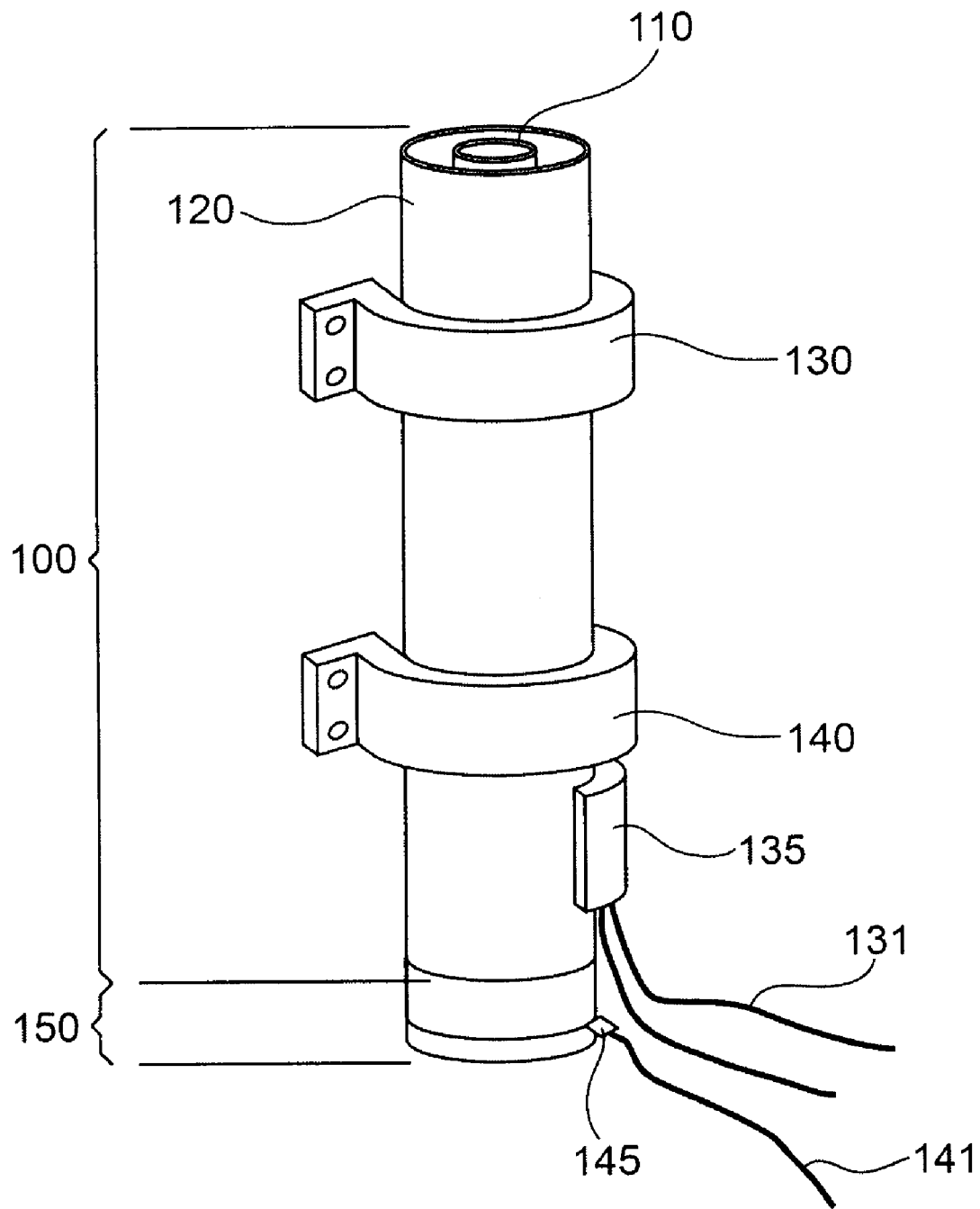
FIG. 1 illustrates a capacitive probe equipped with a multiple-sensor measurement device according to one embodiment of the invention.

FIG. 1 diagrammatically illustrates a capacitive probe 100 of the prior art which we have equipped with the multiple-sensor measurement device 150 according to the invention. The capacitive probe comprises two coaxial metal cylindrical tubes 110, 120, the outer tube 120 being secured using insulating collars 130, 140 on an internal framework of the tank at a predetermined height. The inner tube 110 does not go all the way down to the lower end of the outer tube 120, such that a free space is available at the base of the capacitive probe. The multiple-sensor measurement device 150 advantageously engages in this available space, as will be better seen below.

According to a first variant, the capacitive probe 100 and the multiple-sensor measurement device 150 each have their own connector, designated by 135 and 145, respectively. The connection wires 141 transport low-voltage signals and are preferably sheathed in order to provide protection against electromagnetic interference, in particular against that generated by the signals passing through the connection wires 131.

According to a second variant which is not illustrated, the signals coming from the capacitive probe 100 and the sensors of the measurement device 150 are processed by a local processor, advantageously but not necessarily installed in the measurement device itself, before being transmitted via a data bus to the central processor of the gauging system.

Figure 2:
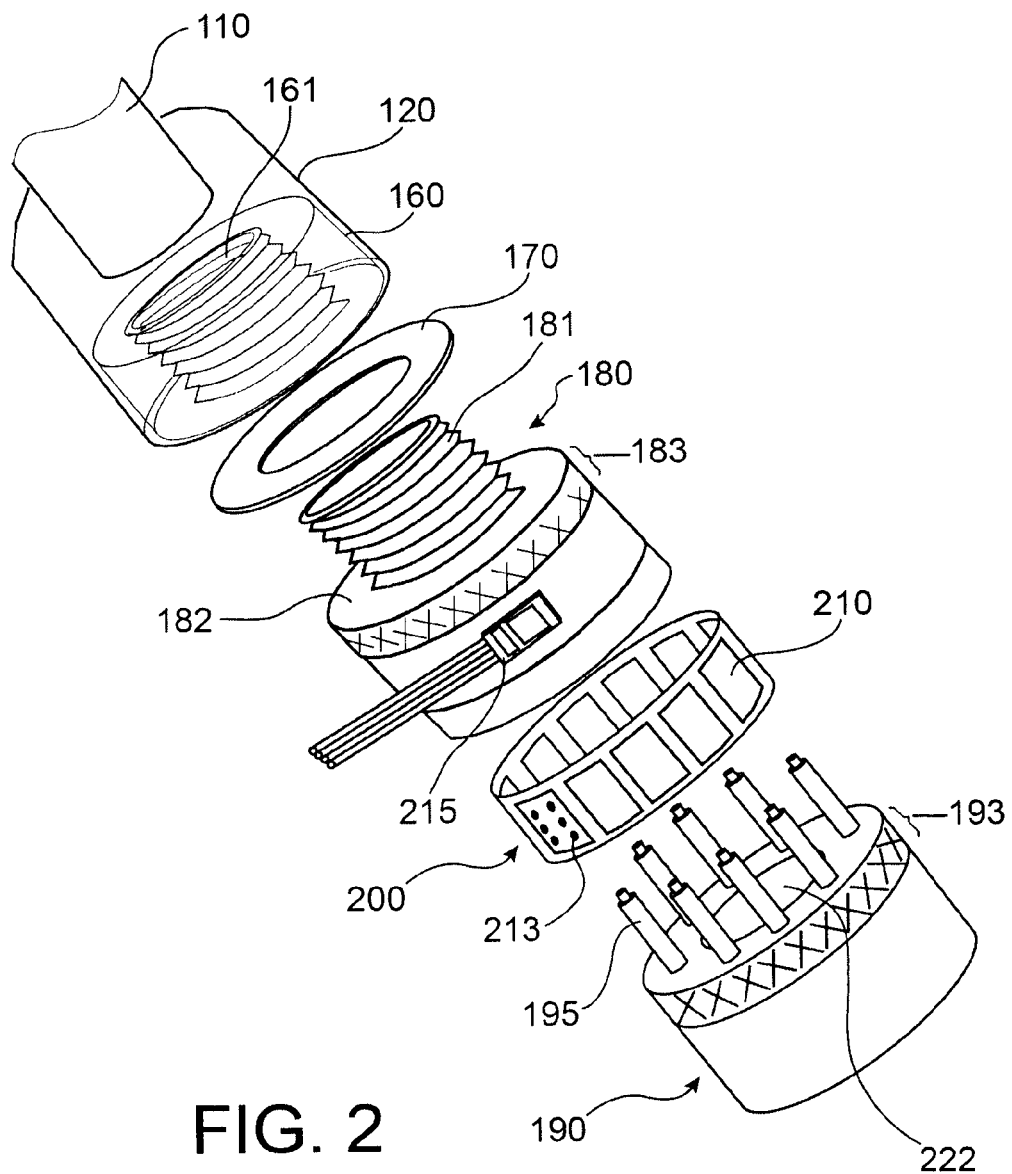
FIG. 2 illustrates, in exploded view, a multiple-sensor measurement device according to one embodiment of the invention.

FIG. 2 illustrates an exploded view showing the lower portion of the capacitive probe as well as the detail of the structure of the measurement device 150.

The multiple-sensor measurement device primarily comprises an insert 160, a first cylindrical piece 180 and a second cylindrical piece 190. The insert 160 assumes the form of an annular piece with an outer diameter substantially equal to the inner diameter of the cylindrical tube 120, and is forcibly mounted inside the latter part without, however, deforming it. Once the insert is put into place, its base flushes with the lower end of the tube. The position of the insert along the axis of the capacitive probe is thus perfectly determined. The insert houses itself under the inner cylindrical tube 110, such that the capacitive measurement is not affected by its presence. It has a threaded axial bore 161 in which a threaded tubular head 181 is screwed, being an integral part of the first cylindrical piece 180.

The outer diameter of the first cylindrical piece 180 is substantially equal to the outer diameter of the tube 120. It comprises, at its upper portion, the threaded tubular head 181, designed to be screwed into the insert. Thus, the assembly constituted by the insert and the tube rests on a shoulder 182 when the first cylindrical piece is in the screwed position. Advantageously, however, a joint 170 can be placed, as indicated, on the shoulder 182 so as to avoid any deterioration of the tube 120 during tightening. Alternatively, according to a variant not illustrated, the insert may have, at its base, a shoulder with a diameter equal to or greater than the outer diameter of the tube, the base of the tube then resting directly on said shoulder.

The outer surface of the cylindrical piece 180 is preferably milled on at least on portion 183 of its height in order to facilitate its tightening. As will be explained in detail below, this piece comprises, at its lower portion, first quick securing means 185 (not visible in this figure).

The second cylindrical piece 190 also has an outer diameter which is substantially equal to that of the tube 120 and is advantageously milled over at least one portion 191 of its height. Second quick securing means 195 are an integral part of the piece 190 or are secured on the upper portion thereof. The first and second quick securing means 185 and 195 cooperate to secure the first and second cylindrical pieces 180 and 190.

According to a first variant of embodiment, the second quick securing means 195 are formed by slugs arranged parallel to the axis of revolution of the second cylindrical piece 190 and mounted in the upper portion thereof. The first quick securing means are then formed by bores 185 in the lower portion of the first cylindrical part 180. The slugs are dimensioned so as to be able to be forcibly engaged in the corresponding bores.

Alternatively, the slugs can be provided on the first cylindrical piece and the bores in the second cylindrical piece.

Preferably, the slugs and corresponding bores are arranged along a uniform angular distribution in order to distribute the mechanical stresses during tightening.

According to a second variant of embodiment not illustrated here, the second quick securing means are formed by snap-fit tabs, elastically deformable, which extend in one or several directions substantially parallel to the axis of revolution of the second cylindrical piece. Each tab ends with a sloped ramp end able to engage in a circular groove arranged in the lower portion of the first cylindrical portion 180.

Alternatively, the snap-in tabs can be provided on the first cylindrical piece and the groove in the second cylindrical piece.

Advantageously, the tabs are arranged according to a uniform angular distribution.

Lastly, other equivalent types of quick securing can be considered by those skilled in the art without going beyond the scope of the invention.

The two cylindrical pieces and, if applicable, the quick securing means are advantageously made in a thermoplastic material.

Figure 3:
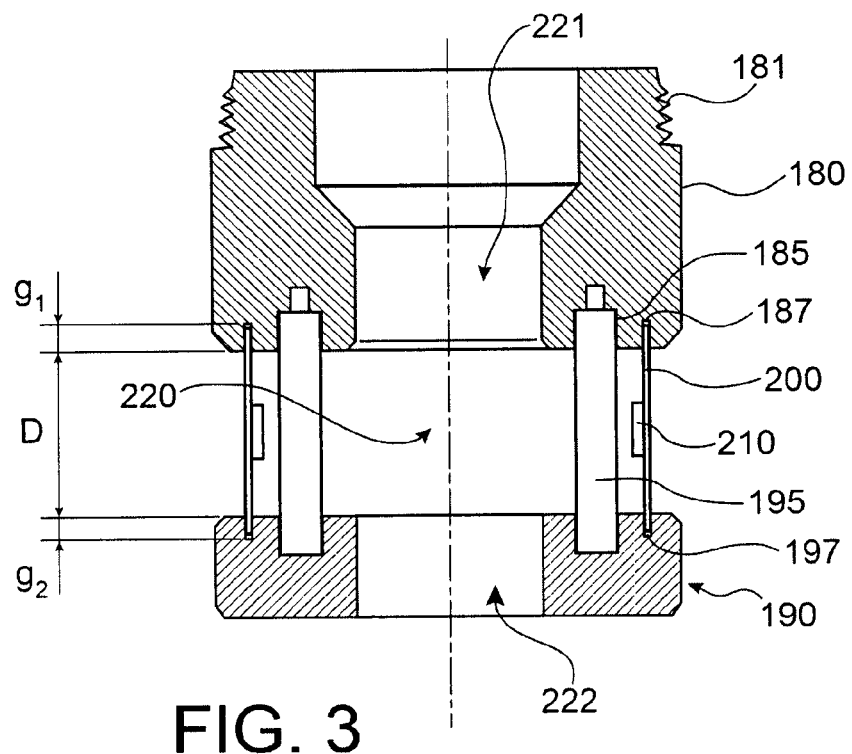
FIG. 3 illustrates an axial cross-section of part of the multiple-sensor measurement device.

FIG. 3 shows an axial section of the two cylindrical pieces assembled using the quick securing means, done here by slugs 195 and corresponding bores 185.

The first and second quick securing means also serve as spacers between the two cylindrical pieces 180 and 190, such that a predetermined distance D is maintained between them.

Circular channels 187 and 197 are arranged in the lower surface of the first cylindrical piece and the upper surface of the second cylindrical piece, respectively. These channels are across from each other when the two pieces are secured by locking of the quick securing means.

An annular film 200, supporting MEMS sensors 210, is mounted captive between the two cylindrical pieces. Its thickness is chosen to be less than the width of the channels 187 and 197 and its height is chosen to be slightly less than $D+g_1+g_2$ where $g_1$ and $g_2$ are the respective depths of the two channels. Thanks to these clearances, the film keeps a freedom of rotation inside these channels even while it is kept captive between the two cylindrical pieces 180 and 190. Furthermore, the distance measured over a vertical axis, between the support 200 and the base of the insert 160, is perfectly determined. Thus, once the capacitive probe is installed in a tank at a predetermined height, the height of the sensors is itself perfectly known.

The first and second cylindrical pieces 180, 190 are pierced with axial holes 221, 222, respectively, having sufficiently large diameters for the fuel to be able to circulate freely between the first and second cylindrical pieces, on one hand, and between the first cylindrical piece and the tube 120, on the other hand. Moreover, the number and the angular extension of the quick securing means are chosen to be small enough for the fuel to circulate freely between the zone 220 and the annular film 200. Thus, the sensors are sure to be continuously in contact with the fuel.

Figure 4:
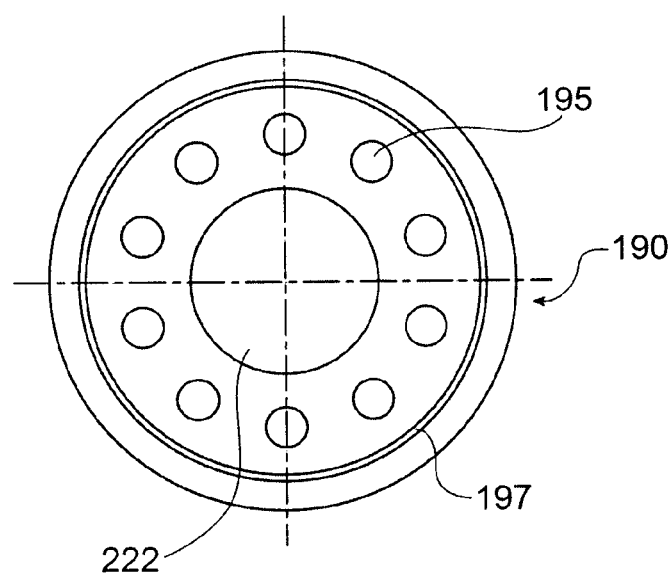
FIG. 4 illustrates a top view of a part of the measurement device according to the invention.

FIG. 4 illustrates, in top view, the second cylindrical piece 190. In the figure, one can see the second quick securing means (formed here by slugs), the circular groove 197 as well as the fuel circulation hole 220.

The annular film 200 is made in an insulating material, preferably in polycarbonate. The sensors 210 are mounted on the inner surface of the annular film such that an operator can manipulate the film without damaging them. A connection interface 213, shared by the different sensors, is also mounted on the outer surface of the annular film. It is advantageously connected to the sensors using wires buried in the material of the film. A connector 215 can be coupled to the connection interface in order to connect the sensors to the local processor or to the central processor. The free rotation of the annular film 200 in the channels 187 and 197 allows an easy connection operation between the interface 213 and the connector 215, independent of the position of the latter part.

In case of malfunction by one of the sensors, the second cylindrical piece can be easily disassembled and the annular film replaced.

The sensors 210 advantageously comprise one, and preferably several, MEMS sensor(s). The role of some of these sensors is to measure the physico-chemical properties of the fuel, in particular its density, viscosity or permittivity. Known for example, from patent application US2002/0194906, is a type of MEMS sensor capable of measuring the density and viscosity of a fluid. The permittivity measurement can be obtained from the capacity measurement of a capacitor whereof one mechanically varies the inter-framework distance or area.

More traditional microelectronic sensors can also be attached on the annular film 200, in particular permittivity or pressure sensors. Thus, the permittivity measurement may be done from the capacity measurement of a standard capacitor and the pressure measurement may be obtained from the voltage measurement of a piezoelectric transducer.

If the case arises, some of the sensors will be identical in nature, in other words a same sensor may be provided several times, for security reasons or for noise reduction by averaging measurements.

The primary fuel height measurement will be obtained from capacity measurements, provided by the capacitive probe, and those of permittivity, provided by the multiple-sensor device.

The secondary fuel height measurement will for example be obtained from pressure and density measurements, provided by the multiple-sensor device. One is thus freed from the installation of secondary MFLI probes and the related drawbacks.

The measurement data resulting from the different sensors is transmitted on a data bus to a local processor or, failing this, to the central processor of the gauging system. Capacity, permittivity, pressure and density measurements can be processed by a local processor, advantageously installed or buried in the body of the second cylindrical piece 190. Alternatively, the local processor can be off-board outside this piece in order to process the measurement data coming from a plurality of capacitor probes and their related multiple-sensor devices.

The local processor can be used for filtering and multiplexing the data it receives. According to a variant, it also performs the calculations for obtaining the primary and/or secondary fuel height measurements and transmits them to the central processor. The communication between the local processor and the central processor will be done, if necessary, using a wireless connection.

Figure 5:
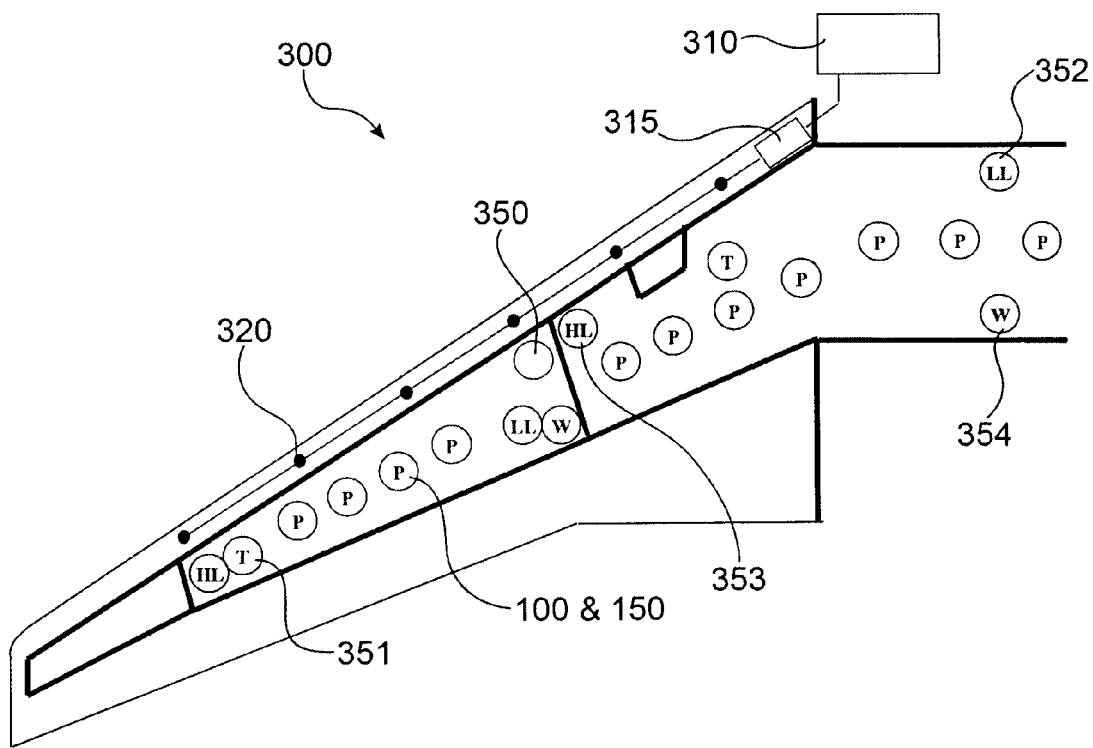
FIG. 5 illustrates an on-board gauging system using multiple-sensor measurement devices according to the invention.

FIG. 5 diagrammatically illustrates a fuel gauging system 300 onboard an aircraft. It comprises a central processor 310, possibly one or several data concentrator(s) 315, local processors 320, capacitive probes 100 on which multiple-sensor measurement devices 150 have been installed, noted P, as well as auxiliary sensors 350 described in detail later.

Each local processor 320 is connected to a plurality of capacitive probes (equipped with multiple-sensor devices) as well as to auxiliary sensors 350 located in its vicinity. The data processed by the local processors is potentially grouped together by a data concentrator before being transmitted to the central processor.

The central processor calculates in particular the quantity of fuel according, on one hand, to primary and/or secondary measurements, provided by the capacitive probes and the multiple-sensor devices, on one hand, and, on the other hand, from the geometry of the tanks. Furthermore, the central processor of the gauging system processes the measurements coming from the auxiliary sensors and transmits, if applicable, the corresponding alarms to the in-flight alarm system.

Among the auxiliary sensors 350 are temperature sensors 351, low level sensors 352, high level sensors 353 and water sensors 354.

The temperature sensors 351 are in particular installed in the outside tanks which are more particularly exposed to significant temperature variations. It is important, in fact, to notify the cockpit when the fuel temperature becomes too low or too high, as this situation can affect the proper operation of the airplane: a temperature which is too low increases the viscosity of the fuel and risks leading to pumping difficulties while a temperature which is too high can cause vapor lock in the engine supply system.

Advantageously, low level sensors are placed in the lowest positions of the different tanks and high level sensors are arranged in positions above which an overflow happens in the surge tank.

The water sensors are preferably placed in low positions of the tank where water, due to its higher density than that of kerosene, is likely to accumulate. They can also advantageously be arranged near certain capacitive probes, so as to allow the identification of a failure in the gauging system.

The temperature sensors, high and low level sensors, water sensors are advantageously MEMS sensors.

Figure 6:
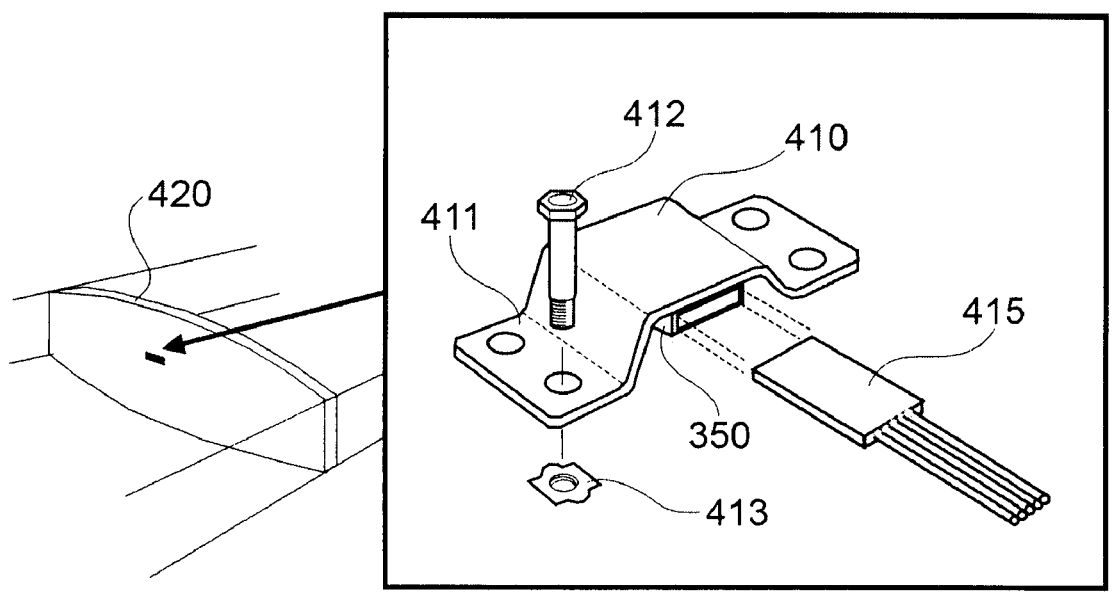
FIG. 6 shows the assembly detail of an auxiliary sensor belonging to the gauging system illustrated in FIG. 5.

FIG. 6 illustrates one of these sensors 350, mounted on the inner surface of a caliper 410. The feet 411 of the caliper are bolted, using bolts 412 and plate nuts 413, onto the internal structure of the aircraft, for example, as illustrated on a wing bay 420. The sensor 350 is placed sheltered from shocks between the structure of the airplane and the caliper 410, which makes it possible to considerably reduce the risk of damage during an inspection or maintenance operation. The sensor can be connected easily using a multiple connector 415.

One will also note that, due to the securing of the caliper on the wing bay, the mounting of the sensor does not require perforation of the tank. Furthermore, in case of malfunction by the sensor, the caliper can be easily disassembled and the sensor replaced.

The invention claimed is:

1. A multiple-sensor measurement device for a gauging system, comprising:
    an insert configured to be inserted along an axis in a capacitive probe so as to assume a predetermined axial position with regard to the probe;
    a support, made of an insulating material, on which a plurality of sensors is mounted, comprising at least one MEMS sensor; and
    retaining means to maintain the support at a predetermined distance from the insert along the axis.

2. The measurement device according to claim 1, wherein the plurality of sensors comprises at least one pressure sensor and one density sensor.

3. The measurement device according to claim 1, wherein the plurality of sensors comprises at least one permittivity sensor.

4. The measurement device according to claim 1, wherein the plurality of sensors comprises sensors identical in nature.

5. The measurement device according to claim 1, wherein the retaining means comprises first retaining means mounted on the insert and second retaining means mounted on the first retaining means using quick securing means, the support being captive between the first and the second retaining means when the quick securing means are locked.

6. The measurement device according to claim 5, wherein the insert has an annular shape and a threaded axial bore.

7. The measurement device according to claim 6, wherein the first retaining means includes a first cylindrical piece, coaxial with the insert, and ending at its upper portion by a threaded tubular head configured to be screwed into the bore, the cylindrical piece being pierced by an axial hole, all the way through.

8. The measurement device according to claim 7, wherein the second retaining means includes a second cylindrical piece, coaxial with the first cylindrical piece, and pierced by an axial hole, all the way through.

9. A multiple-sensor measurement device for a gauging system, comprising:
    an insert configured to be inserted along an axis in a capacitive probe so as to assume a predetermined axial position with regard to the probe;
    a support on which a plurality of sensors is mounted, comprising at least one MEMS sensor; and
    retaining means to maintain the support at a predetermined distance from the insert along the axis, wherein
    the retaining means comprises first retaining means mounted on the insert and second retaining means mounted on the first retaining means using quick securing means, the support being captive between the first and the second retaining means when the quick securing means are locked,
    the insert has an annular shape and a threaded axial bore,
    the first retaining means includes a first cylindrical piece, coaxial with the insert, and ending at its upper portion by a threaded tubular head configured to be screwed into the bore, the cylindrical piece being pierced by an axial hole, all the way through,
    the second retaining means includes a second cylindrical piece, coaxial with the first cylindrical piece, and pierced by an axial hole, all the way through, and
    first and second circular channels are arranged across from each other, in a lower surface of the first cylindrical piece and in an upper surface of the second cylindrical piece, respectively, the support being formed by an annular film whereof the upper portion is freely engaged in the first channel and the lower portion is freely engaged in the second channel.

10. The measurement device according to claim 9, wherein a connection interface shared by different sensors is mounted at the outer surface of the annular film, and connection wires between the sensors and the interface are buried in the material of the film.

11. The measurement device according to claim 10, wherein the material of the film is polycarbonate.

12. The measurement device according to claim 9, wherein the sensors are mounted on the inner surface of the annular film.

13. The measurement device according to claim 8, wherein the quick securing means comprises slugs mounted on one of the first and second cylindrical pieces and corresponding bores in the other piece, and the slugs are dimensioned to engage forcibly in the corresponding bores.

14. The measurement device according to claim 8, wherein the quick securing means comprises snap-in tabs that are an integral part of one of the first and second cylindrical pieces and a corresponding groove in the other piece, and the tabs are configured to snap into the corresponding groove.

15. A fuel gauging system onboard an aircraft comprising:
    a plurality of capacitive probes installed at predetermined heights in a plurality of fuel tanks;
    a plurality of multiple-sensor measurement devices according to claim 1, the devices being mounted on the capacitive probes, respectively;
    a plurality of local processors, each local processor configured to perform processing of measurement data coming from the capacitive probes, of the multiple-sensor measurement devices to which it is connected;
    a central processor configured to calculate, from the data processed and from geometric characteristics of the plurality of tanks, the quantity of fuel they contain.

16. The gauging system according to claim 15, further comprising a plurality of auxiliary sensors installed in the plurality of tanks, each auxiliary sensor belonging to a set including a high level sensor, a low level sensor, a water sensor, and a temperature sensor, each auxiliary sensor being connected to one of the local processors, the one of the local processors configured to process the measurement data coming from the auxiliary sensor.

17. The gauging system according to claim 16, wherein the auxiliary sensors are MEMS sensors.

18. The gauging system according to claim 17, wherein each MEMS sensor is mounted on the inner surface of a caliper including feet bolted onto an internal structure of the aircraft.

19. The measurement device according to claim 1, wherein the support is an annular film.

20. The measurement device according to claim 1, wherein
the retaining means comprises first retaining means and second retaining means,
the support is captive between the first and second retaining means, and
the support is freely engaged between the first and second retaining means.

\* \* \* \* \*